S. McNEW.
Apple Parer and Corer.
No. 227,912.          Patented May 25, 1880.
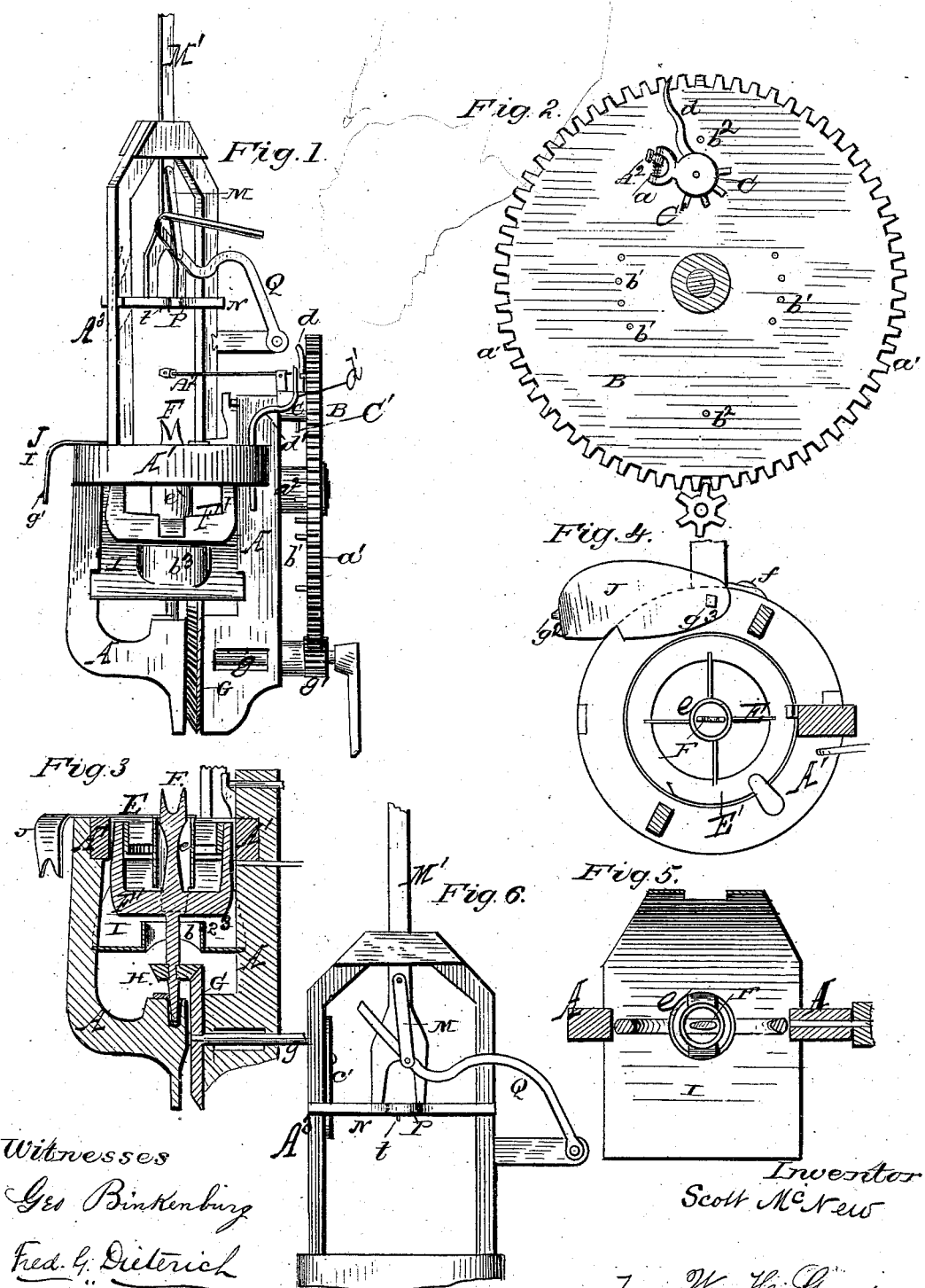
Witnesses
Geo Binkenburg
Fred. G. Dieterich
Inventor
Scott McNew
by W. H. Goddard
attorney

UNITED STATES PATENT OFFICE.

SCOTT McNEW, OF LOCK SPRING, INDIANA.

APPLE PARER AND CORER.

SPECIFICATION forming part of Letters Patent No. 227,912, dated May 25, 1880.

Application filed February 2, 1880.

*To all whom it may concern:*

Be it known that I, SCOTT McNEW, of Lock Spring, in the county of Ripley and State of Indiana, have invented certain new and useful Improvements in Paring and Coring Apples; and I do hereby declare the following to be a full, clear, and exact description of the invention, such as will enable others skilled in the art to which appertains to make and use the same, reference being had to the accompanying drawings, and to letters of reference marked thereon, which form a part of this specification.

Figure 1 is a side elevation of my improved fruit parer, corer, and slicer. Fig. 2 is a detail side view of the wheel which intermittently operates the knife. Fig. 3 is a detail section of the machine. Fig. 4 is a horizontal section of the same, as is also Fig. 5, taken below the plane of the section of Fig. 4; and Fig. 6 is a detail side view thereof.

This invention contemplates improvements in machines for paring, coring, and slicing fruit, especially apples; and it consists, principally, of the knife-operating mechanism to simultaneously pass the knife over and cause the paring of the apple or fruit, with the changing of the presentation of the apple to the knife, and to effect the return of the knife to the point of beginning; of provision to permit of the holding of the fruit in proper position while being cored and sliced; and of means for effecting a separation and the discharge of the parings, core, and the cut portions of the fruit, substantially as hereinafter more fully set forth.

In the accompanying drawings, A marks an upright frame with a circular open upper end, A'. F is a fork, extending up centrally in the circular opening of the frame A, with its lower end bearing in a socket in the frame A, and provided with a frame, F', having a circular open end or annular rim, E', fitting within the circular open end A' of the frame A, to which rim and a tube, $e$, secured around the fork F, which constitutes the core-tube, are connected the ends of the radial slicing-knives E. The shaft of the fork is provided with a beveled pinion, H, gearing with an upright beveled wheel, G, the shaft $g$ of which bears horizontally in the frame A and carries a pinion, $g'$, which is driven by the knife-operating wheel meshing with the pinion $g'$.

B is the knife-operating wheel, which as above stated, also operates the apple or fruit holding fork F by the engagement of its cogs $a'$ with those of the pinion $g'$, and is hung or mounted upon a shaft, $a^2$, fastened to the frame A. The inner face of the wheel B is provided with two groups of pins, $b'$, each four in number, and with two opposite pins, $b^2$, spaced a greater distance apart than the groups, and relatively arranged with the latter, so that a curved line drawn or passing through them would form an ellipse.

C is a pinion hung in the frame A coincidently with the path or plane of the pins $b' b^2$, and having on one side an equal number of teeth or pins, C', with one of the groups of pins, $b'$, and on the other or opposite side an arm, $d$, and carrying the knife $A^2$ just in rear of the arm $d$.

The conjoint operation of the wheel B and the pinion C with their adjuncts effects the passing of the knife over and so as to pare the apple or fruit in position on the fork F, and after this action causes the return of the knife to the point of commencement of its forward cutting action without producing a jerking action of the knife as it strikes the apple or fruit.

The pinion C, after its arm $d$ is released from the engaging-pin $b^2$ of the wheel B, is caught and supported by a second arm, $d'$, attached to the table or frame A, until the arrival of the next approaching group of pins $b'$ engages its teeth C' to return it to its former position for the purpose aforesaid.

The knife $A^2$ has its outer end adjustably secured in a rocking shaft, $a$, with a coiled spring around it, and hung in a bifurcated arm of the pinion C. This arrangement, while it holds the knife in forcible contact with the fruit, also permits the knife to yield to the general contour of the fruit, and exerts just sufficient pressure on the knife to cause it to cut only the depth of the thickness of the rind or skin of the fruit, its pressure or tension being regulated by a tension-regulating screw.

Affixed to the upper side of the frame A is a second upright frame, $A^3$, having a vertically-sliding cross-bar, N, with pins $t$ on its under side, while to its upper side is secured a plunger, M', moving in the upper end of the frame $A^3$.

Q is a lever, pivoted to an arm of the frame $A^3$ and connected to a link, M, on the plunger M'.

A hole, P, (in dotted lines, Fig. 6,) in the bar N conforms to the opening in the core-tube $e$, to aid the coring of the apple or fruit. This device N is held in an elevated position when not in use by inserting the handled end of the lever Q over a catch, $c'$, on the frame $A^3$. Coinciding with the core-tube $e$, and below the frame F' of the slicing-knives E, is a second tube, $b^3$, to carry the core falling through and from the tube $e$ off and permit its discharge in a suitable receptacle below, separate from the parings and cut portions, which (the latter) are simultaneously falling upon the inclined plate I, and are discharged to one side in a separate receptacle suitably placed for that purpose.

While the paring operation is taking place, the hinged plate J is in position, covering the off side of the upper end of the frame A, and prevents the parings falling on that side passing down in between the slicing-knives, and thus keeps them separate from the subsequently-sliced fruit.

A catch, $g^2$, secures the plate or shield J in position, with its other end hinged at $g^3$ to the frame A.

Having thus fully described my invention, I claim and desire to secure by Letters Patent of the United States—

1. In a fruit-parer, the combination, with the pinion C, having the teeth C', arm $d$, and the knife $A^2$, of the wheel B, having groups of pins $b'$ and pins $b^2$, and arm $d'$ of the table A, substantially as and for the purpose set forth.

2. In a fruit parer, corer, and slicer, the combination, with the frame A, of the circular slicing-knife frame E', provided with the tube $e$ and tube $b^3$, secured under and in line with the tube $e$, substantially as and for the purpose specified.

3. The combination, with the frames A A', the latter having the arm $d'$, the fork F, having the pinion H, and its frame F', carrying the slicing-knives E and corer-tube $e$, of the pinion C, having teeth C' and $d$ and knife $A^2$, and gear-wheel B, having groups of teeth or pins $b'$ and opposite pins $b^2$, substantially as and for the purpose set forth.

In testimony that I claim the foregoing I have hereunto set my hand this 10th day of November, 1879.

SCOTT McNEW.

Witnesses:
CHRIS. SHANE,
JAMES A. TAYLOR.